United States Patent [19]

Stevenson

[11] Patent Number: 5,289,844
[45] Date of Patent: Mar. 1, 1994

[54] CLAMPING ASSEMBLY FOR VEHICULAR TRANSMISSION OPERATING CONTROL VALVES

[75] Inventor: Paul D. Stevenson, Ann Arbor, Mich.

[73] Assignee: General Motors Corporation, Detroit, Mich.

[21] Appl. No.: 37,213

[22] Filed: Mar. 26, 1993

[51] Int. Cl.$^5$ .............................................. F16B 1/00
[52] U.S. Cl. ..................................... 137/343; 251/367; 411/155; 411/544; 403/397; 403/405.1
[58] Field of Search ............... 137/343, 899, 351, 354, 137/355, 377, 346, 347, 348, 350, 328; 251/367; 267/161, 163, 164; 411/155, 544, 368, 156; 403/329, 326, 397, 405.1; 248/316.7

[56] References Cited

U.S. PATENT DOCUMENTS

| | | | |
|---|---|---|---|
| 3,521,664 | 7/1970 | Medici | 137/343 |
| 3,794,067 | 2/1974 | Beck | 137/343 |
| 4,280,527 | 7/1981 | Pease | 137/343 |
| 4,349,046 | 9/1982 | Klem | 137/899 |
| 4,394,002 | 7/1983 | Polley | 137/350 X |
| 5,106,225 | 4/1992 | Andre et al. | 403/405.1 X |

Primary Examiner—Martin P. Schwadron
Assistant Examiner—Kevin L. Lee
Attorney, Agent, or Firm—Donald F. Scherer

[57] ABSTRACT

A clamping assembly for securing a transmission operating control valve body to a transmission case. The clamping assembly utilizes at least one biasing member having a hub portion. The hub portion has a generally centrally disposed aperture with a plurality of spring arms extending radially outwardly from the hub portion. Each spring arm has a distal end that is adapted to engage the valve body. A spacer is interposed between the hub portion and the valve body. A fastener is receivable through the aperture and through the valve body to be anchored in the transmission case, thereby securing the valve body in position. In the exemplary form of the invention shown and described each spring arm is provided with a preformed offset commensurate with the length of the spring arm, its cross-sectional configuration and the modulus of elasticity thereof such that when the hub portion of the biasing member is tightened against the spacer, the resulting deflection of the distal end of each said spring arm will provide a predetermined load against the valve body. The spacer may constitute a supplemental biasing member, in which case it will be provided with a spacer hub, and supplemental spring arms will extend outwardly from the spacer hub. Support posts may be carried on the supplemental spring arms to engage said valve body.

9 Claims, 3 Drawing Sheets

CLAMPING ASSEMBLY FOR VEHICULAR TRANSMISSION OPERATING CONTROL VALVES

TECHNICAL FIELD

The present invention relates generally to vehicular transmissions. More particularly, the present invention relates to assemblies for attaching a transmission operating valve to a supporting surface. Specifically, the present invention relates to a clamping assembly which requires only one fastener to secure a transmission operating valve to a supporting surface.

BACKGROUND OF THE INVENTION

Sophisticated automatic transmissions for vehicles are typically operated by complex hydraulic systems. Hydraulic systems for vehicular transmissions require a source of hydraulic fluid, a pump to pressurize that fluid and some means, such as a pressure regulator, to control the "line pressure" output to the transmission. One of the primary functions of the pressurized hydraulic fluid is to operate numerous torque transfer devices—i.e., clutch and brake assemblies—which determine the drive gear ratios by which the torque generated by the vehicle engine is transmitted to the wheels or the like. Some of the pressurized fluid may also be employed to lubricate the transmission and the associated mechanism.

Even the most routine movement of the transmission selector lever by the vehicle operator actuates a "manual valve" which directs the pressurized hydraulic fluid to at least one or more specific torque transfer devices which exhaust the pressurized fluid from one or more of the other torque transfer devices. The state of the several torque transfer devices utilized by the transmission—i.e., whether they are pressurized or depressurized—determines the gear ratio provided by the transmission.

Assuming that the operator has positioned the selector lever, such that the manual valve effects a transmission output which moves the vehicle forwardly, as the vehicle accelerates, a succession of shifts will automatically be effected to shift the transmission through a succession of drive ratios. The signal which evidences the vehicle speed is often supplied by a governor assembly that generally includes a regulating valve to supply a governor output signal pressure, the magnitude of which is reflected by the speed at which the transmission output shaft is rotating. The output signal pressure from the governor may, in turn, be directed to another valve which controls the shift by directing pressurized hydraulic fluid to or from those torque transfer devices which effect the shift to the next successive gear ratio. Each gear ratio requires actuation of its own combination of torque transfer devices, and some provision is generally required to deactivate certain other torque transfer devices in order to accomplish the desired shift.

Sophisticated transmission controls also include a provision to alter the vehicular speed at which any given shift is effected. The transmission controls which incorporate speed response as one of the contributing factors in determining when a shift is to be accomplished generally employ a modulator valve. The modulator valve provides a signal pressure to the required shift valves in response to engine vacuum. The modulator valve is generally operated by engine vacuum or throttle position.

The foregoing brief résumé is presented to emphasize the complexity of hydraulic systems employed to control vehicular transmissions. The more subtle the reaction required by the transmission in response to operation of the vehicle, the more complex the hydraulic control system becomes. Even so, the complex valving, together with the required maze of passages, are generally contained within a single valve assembly that is secured, for example, to a supporting surface provided on the transmission case.

One face of a typical prior art oil pump and transmission control valve body 10 is depicted in FIG. 1. Both faces of the valve body 10 are generally of comparable complexity, and the depicted face 11 is, therefore, representative of that complexity. Specifically, face 11 is provided with a maze of surface passages, generally referred to as wormtracks 12 which provide the required communication along the opposite faces of the valve body in order to achieve communication with the components contained within the valve body 10. A supporting surface (not shown in FIG. 1) to which the valve body 10 may be secured is generally provided on the transmission case. The supporting surface, as well as the cover plate (also not shown), which matingly engage the opposite faces of the valve body 10, are similarly provided with wormtracks that cooperatively interact with the wormtracks recessed into the faces of the valve body 10. Passageways may penetrate the valve body 10, as required, to effect communication between appropriate wormtracks recessed within the opposite faces of the valve body 10.

Various chambers and bores are disposed between and generally in parallel relation with the opposite faces of the valve body 10 to house the several valve members and the associated components that are received within the transmission control valve body 10. FIG. 1 depicts, in exploded plan, a representative sampling of the components that are operatively received within the various chambers and bores that extend within the valve body 10. Starting at the one o'clock position on FIG. 1, one can observe the throttle valve member 13, the throttle valve spring 14, the throttle valve plunger 15 and the throttle valve plunger bushing 16 which are received within a laterally extending bore (not shown) that penetrates the right side 18 of the valve body 10. A retainer pin 19 secures those components within that bore. Continuing clockwise on FIG. 1, the next bore (also not shown) that penetrates the right side 18 of the valve body 10 receives a pressure regulator valve 20, a pressure regulator valve spring 21, a pressure regulator isolator spring 22, a reverse boost valve 23, a pressure regulator and reverse boost valve bushing 24, a boost valve 25, an isolator valve bore plug 26 and a valve retainer ring 28, all of which are secured by the retainer pin 29.

The 3-2 shift control valve 30, its biasing spring 31 and a spring retainer sleeve 32 are received within an independent bore (not shown) that penetrates the lower portion on the right side 18 of the valve body 10. The Lo blow-off ball 33, its biasing spring 34 and a retainer plug 35 are received in another bore (not shown) which penetrates the lower side 36 of the valve body 10, also as viewed in FIG. 1.

A bore also penetrates the lower portion on the left side 38 of the valve body 10, to receive a 1-2 shift valve 40, a 1-2 throttle valve 41, a 1-2 throttle valve spring 42 and a 1-2 throttle valve bushing 43, all of which are maintained within that bore by a retainer pin 44. Another bore (not shown) also penetrates the lower portion on the left side 38 of the valve body 10 to receive a 2-3 shift valve 45, a 2-3 throttle valve 46, a 2-3 throttle valve spring 48 and a 2-3 throttle valve bushing 49, all of which are secured within that bore by a retainer pin 50.

A first bore (also not shown) penetrates the middle portion on the left side 36 of the valve body 10 to receive a 1-2 accumulator valve 51, a 1-2 accumulator bushing 52, a 1-2 accumulator spring 53, a valve bore plug 54 and a retainer pin 55. A second bore penetrates the middle portion on the left side 38 of the valve body 10 to receive a pressure relief ball 56, a pressure relief biasing spring 58 and a spring retainer sleeve 59. In addition, a third bore penetrates the middle portion on the left side 38 of the valve body 10 to receive a T.V. shift valve 60, a T.V. shift spring 61, a valve bore plug 62 and a retainer pin 63.

A pressure regulator bore plug 64 and an associated retainer 65 close the bore that extends through the upper portion on the left side 38 of the valve body 10. Finally, a line boost valve 66, a line boost valve plug 68 and a retainer pin 69 are received within a bore that penetrates the top surface 70 of the valve body 10.

Most important to the present invention is the fact that the prior art transmission valve bodies, as well as the cover plates employed therewith, must accommodate a considerable number of bolts, such as the seventeen bolts 75A through 75Q depicted, required effectively to secure the valve body 10 and its cover plate to the supporting structure on which they are mounted. It should be appreciated that each mounting bolt 75 must penetrate the valve body 10 with sufficient clearance from adjacent valve chambers and bores (not shown), as well as the wormtracks 12, to permit the bolts 75 to secure the valve body 10 to its supporting surface without distorting or damaging the valve body 10 itself as well as to assure that the wormtracks 12 will be effectively sealed from adjacent wormtracks as well as from the environment in which the transmission is operated.

As previewed above, and in the detailed description which follows, a particular structural member, component or arrangement may be employed at more than one location. When referring generally to that type of structural member, component or arrangement, a common numerical designation shall be employed. However, when one of the structural members, components or arrangements so identified is to be individually identified, it shall be referenced by virtue of a letter suffix employed in combination with the numerical designation employed for general identification of that structural member, component or arrangement. Thus, there are a plurality of bolts which are generally identified by the numeral 75, but the specific individual bolts are, therefore, identified as 75A, 75B, 75C, etc., in the specification and on the drawings. This same suffix convention shall be employed throughout the specification.

SUMMARY OF THE INVENTION

It is, therefore, a primary object of the present invention to provide a new and novel clamping assembly to secure the body of a transmission operating control valve to its supporting structure with the minimum number of fastening means.

It is another object of the present invention to provide a clamping assembly, as above, which permits the valving members in a transmission operating control valve to be positioned more closely together.

It is a further object of the present invention to provide a clamping assembly, as above, wherein at least a primary biasing member is incorporated in the clamping assembly to provide relatively uniform distribution of a compression load across those surfaces of the valve body which engage a gasket or other sealing means.

It is still another object of the present invention to provide a clamping assembly, as above, that permits the valve with which it is employed to have a smaller overall dimension.

These and other objects of the invention, as well as the advantages thereof over existing and prior art forms, which will be apparent in view of the following detailed specification, are accomplished by means hereinafter described and claimed.

In general, a clamping assembly embodying the concepts of the present invention employs only one bolt or other type of fastener to secure a transmission operating control valve to a supporting surface on the transmission case, rather than a plurality of bolts as was required by the prior art. The clamping assembly is designed to permit relatively uniform load distribution across the surface of the valve intended to contact a gasket or other sealing means in order to preclude the need for additional bolts.

An exemplary construction of a clamping assembly adapted to accomplish the foregoing objects may include at least a primary biasing member having a hub portion and a plurality of spring arms which extend outwardly from the hub portion to engage the body portion of the valve and thereby clamp the valve firmly against a supporting surface on the transmission case. A single fastener is received through the hub portion of the biasing member to secure the valve to the transmission case.

The present invention is described in conjunction with one exemplary embodiment of a clamping assembly which is deemed sufficient to effect a full disclosure of the subject invention. The exemplary clamping assembly is described in detail without attempting to show all of the various forms and modifications in which the invention might be embodied; the invention being measured by the appended claims and not by the details of the specification.

DESCRIPTION OF AN EXEMPLARY EMBODIMENT

Figure 1:
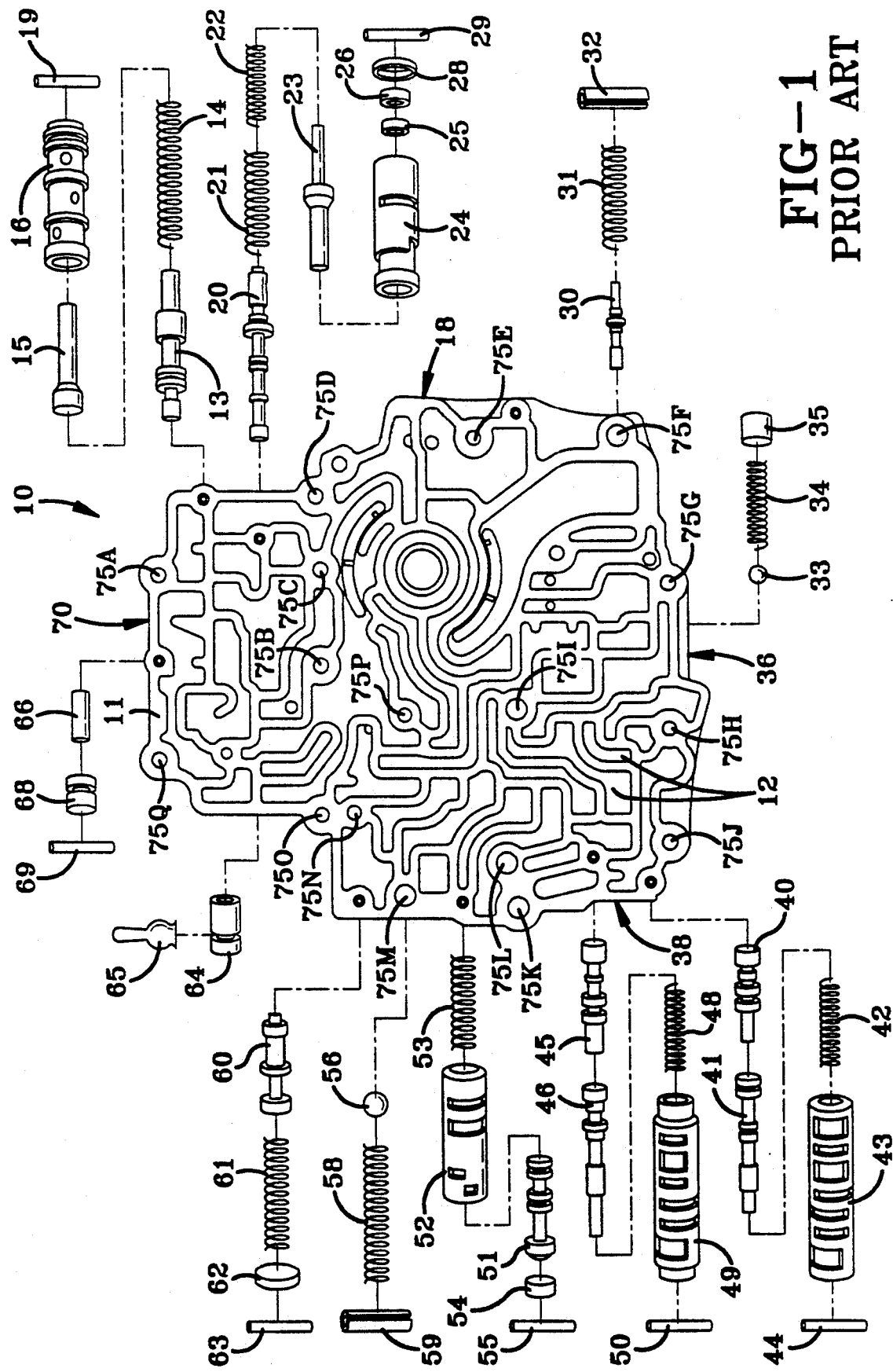
FIG. 1 is an exploded plan view of a conventional valve body employed by the prior art.
Figure 2:
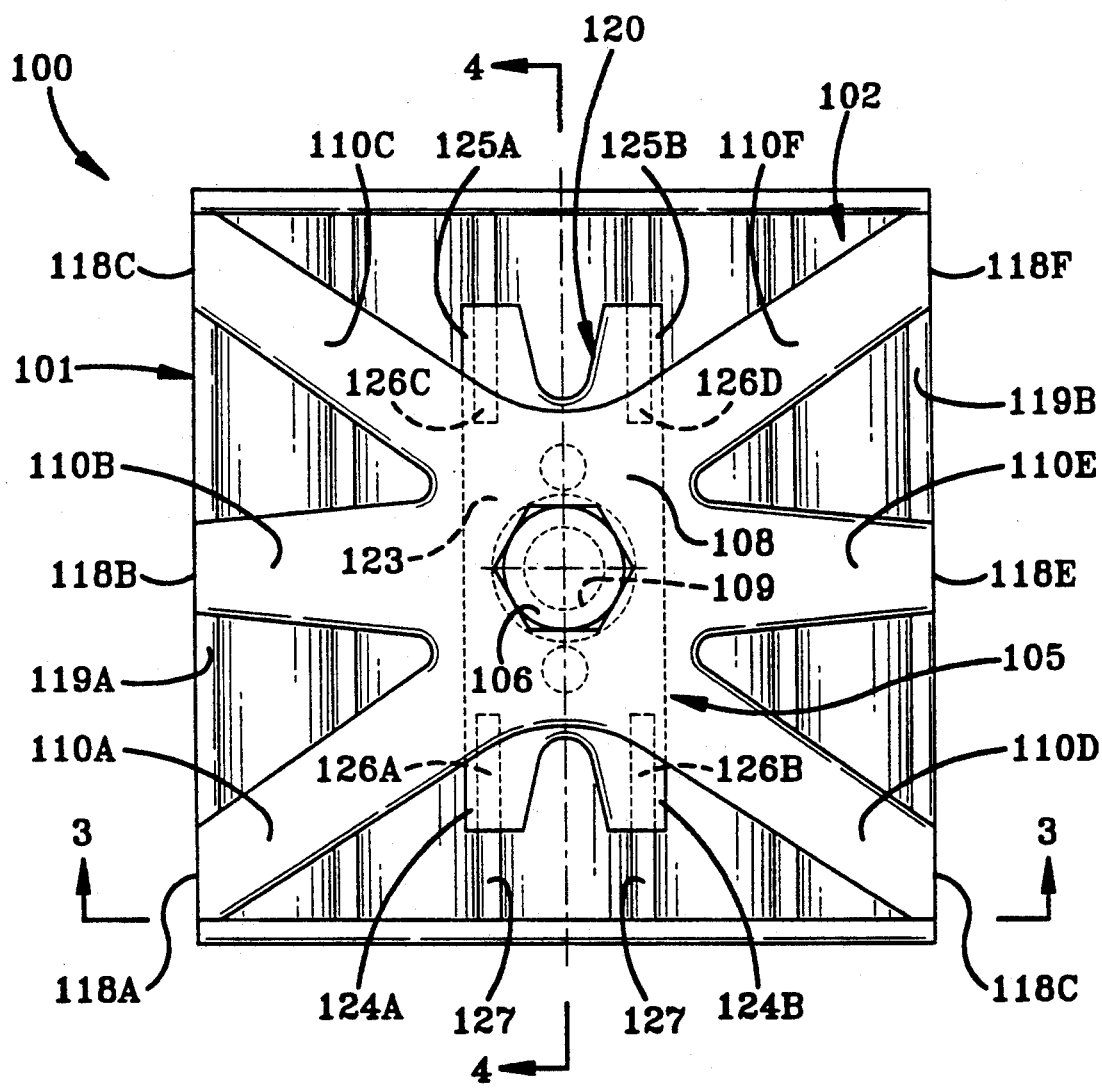
FIG. 2 is a top plan view of a clamping assembly embodying the concepts of the present invention, positioned to secure a transmission operating control valve to a supporting surface.
Figure 3:
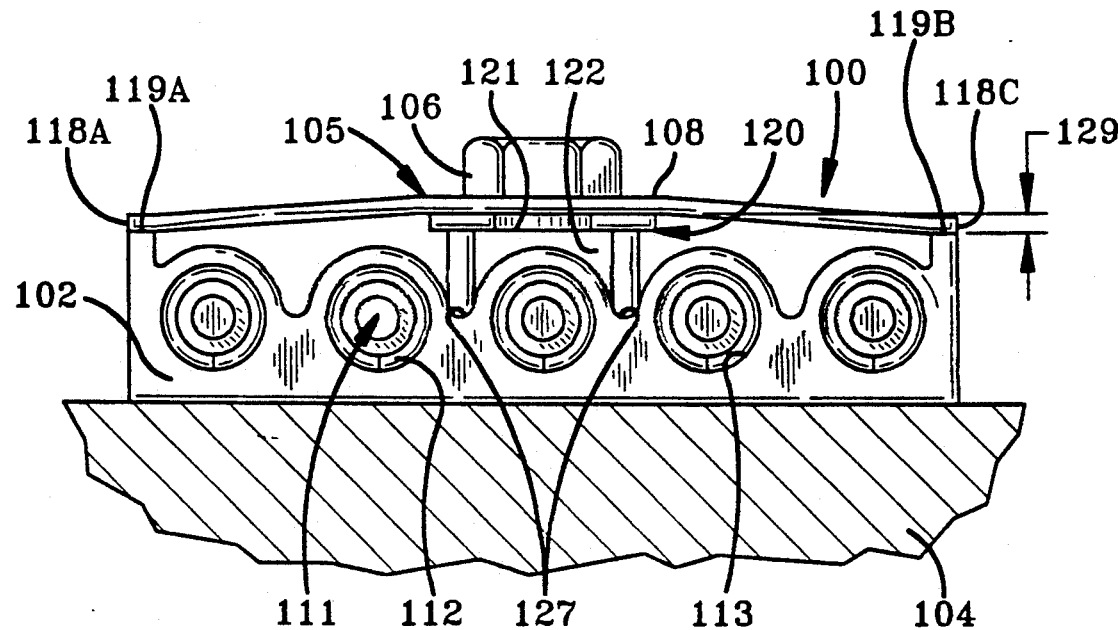
FIG. 3 is a cross-sectional view taken substantially along line 3—3 of FIG. 2.
Figure 4:
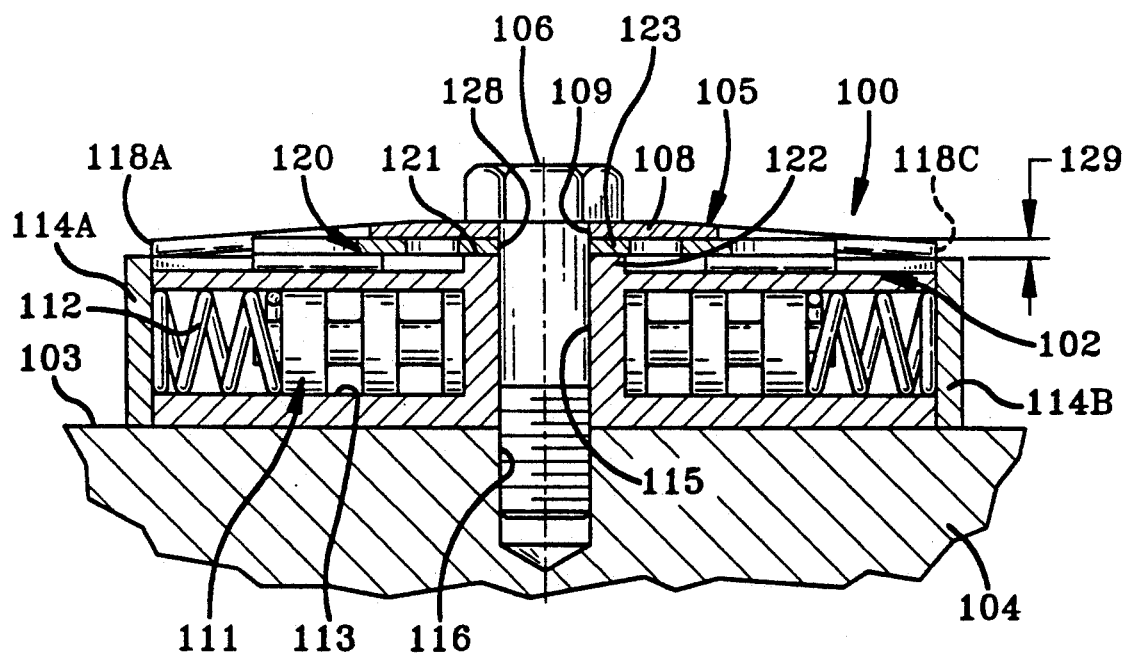
FIG. 4 is a cross-sectional view taken substantially along line 4—4 of FIG. 2.

One representative form of a clamping assembly 100 embodying the concepts of the present invention—and which is particularly well adapted for mounting a vehicular transmission operating control valve assembly 101—is depicted in FIGS. 2 through 4 of the accompanying drawings. The clamping assembly 100 is depicted in conjunction with a control valve assembly 101 having a valve body 102. The control valve assembly 101 may employ a cover, as is well known to the art, but the cover is not critical to the present invention. Hence, only a valve body 102 is represented in FIGS. 3 and 4. The valve body 102 engages and is attached to a supporting surface 103 such as may be presented from the case 104 of a vehicular transmission. Inasmuch as vehicular transmissions are well known in the art, only that portion of the transmission case 104 which presents the supporting surface 103 to which the control valve assembly 101 is secured has been depicted in FIGS. 3 and 4 of the drawings.

The clamping assembly 100 includes at least one primary biasing member 105. Only one fastening means, such as a machine bolt 106 is employed in conjunction with the primary biasing member 105 to secure that biasing member 105 to the supporting surface 103. The primary biasing member 105 may be fabricated from any material having a suitable modulus of elasticity so that it can be preformed to the required configuration and be capable of effecting the desired result, as will be hereinafter more fully described.

As shown in FIG. 2, a preferred form of the primary biasing member 105 includes a hub portion 108 which is penetrated by a mounting aperture 109 that may be disposed centrally of the hub portion 108 to receive the fastener bolt 106. A plurality of spring arms 110, such as the six 110A through 110F depicted, extend outwardly from the hub portion 108 to engage the valve body 102—or, if employed, a valve cover—to urge the valve assembly 101 against the supporting surface 103 and thereby secure the valve assembly 101 to the supporting surface 103.

As mentioned, the fastening means 106 can be any common fastener known to the art. For example, the fastening means may well be a machine bolt 106, as shown, of the standard variety and having sufficient strength to secure the clamping assembly 100 and the valve assembly 101 to the supporting surface 103 of the transmission case 104. While the prior art requires the use of several bolts 75 to fasten a valve body 10 to the vehicular transmission case, the present invention is unique in that it requires only the one fastening bolt 106. Because only one such fastener is required, the valve elements (as represented schematically at 111 in FIGS. 3 and 4) and the associated mechanism (such as the represented by the springs 112) contained within the bores 113 extending laterally between the side plates 114 may be positioned more closely together thus permitting the valve body 102 to be smaller and take up less space.

The valve body 102 may be made of any suitable material known to the art. Typically, the valve body 102 is made from die cast aluminum or perhaps a rigid plastic. Furthermore, the valve assembly 101 is conventional in its operation. The only significant difference is that when a clamping assembly 100 is employed, the valve body 102 does not have a plurality of bores extending therethrough to receive the corresponding plurality of bolts 75 required to secure the prior art valve body 10 to the supporting surface of a transmission case. Instead, as shown in FIGS. 2-4, the valve body 102 has only a single bore 115 therethrough to receive the bolt 106 by which the clamping assembly 100 is secured to the supporting surface 103 on the transmission case. Similarly, the supporting surface 103 presented from the transmission case 104 has only one threaded bore 116 to receive that single bolt 106.

As will be appreciated from the following explanation, when the bolt 106 is tightened to secure the clamping assembly 100 against the valve assembly 101, each spring arm 110 presented from the primary biasing member 105 provides a predetermined force against the valve assembly 101. That predetermined biasing force can be selected to assure a relatively uniform compression load between the valve body 102 and the supporting surface 103. This result obviates the need for using additional fastening means 106. The aforesaid load distribution is achieved by the configuration of the individual spring arms 110 and the modulus of elasticity of the material from which the biasing member 105 is fabricated.

In effect, each spring arm 110 is a single leaf spring the proximal end of which is affixed to the hub portion 108 of the primary biasing member 105. The other or distal end 118 of each spring arm 110 is axially offset with respect to the hub portion 108 and is free to engage a reaction surface 119 on the body portion 102 of the valve assembly 101. That is, each spring arm 110 may be approximated as a cantilevered beam, and more precisely, one that has been preformed to bend curvilinearly against the direction of the deflection that will be induced when the biasing member 105 is secured by the bolt 106.

The configuration of the spring arms 110 which provides a predetermined deflection in response to a particular loading applied to the distal end 118—or conversely, the deflection required of the distal end 118 for it to impose a given force against the reaction surface 119 engaged thereby—may be readily calculated by employing beam design theory. As such, the spring arms 110 may be designed with a relatively uniform cross section, or they may be designed as beams of approximately uniform strength along their entire length.

In either event, the controlling design parameter is that the spring arms 110 will deflect a mathematically predictable amount in response to a predetermined load or vice versa. Accordingly, one may ascertain the load desired to be imposed by the distal end 118 of each spring arm 110 where it engages the appropriate reaction surface 119 presented from the valve assembly 101, and then determine the deflection to which each spring arm 110 needs to be subjected in order to apply the desired force. With that information in hand, the biasing member 105 may be fabricated such that the distal end 118 of each spring arm is offset from the plane of the hub portion 108 by a distance that will permit the distal end to be deflected through the required distance when the biasing member 105 is secured into position.

The formula for approximating the deflection of a spring arm 110 having a uniform cross section is:

$$y = \frac{Pl^3}{3EI} \tag{1}$$

wherein y denotes: the deflection for the distal end 118 of the spring arm 110 under consideration, measured in inches;

P denotes: the load applied by the distal end 118 of that spring arm 110, measured in pounds;

l denotes: the length of that spring arm 110, measured in inches;

E denotes: the Modulus of Elasticity of the material from which that spring arm 110 is fabricated, measured in pounds per square inch; and, I denotes: the moment of inertia for the cross section of the spring arm 110 relative to the neutral axis of that cross section, the moment of inertia being measured in inches$^4$.

When one considers the stresses applied to a cantilevered beam, it becomes apparent that the maximum unit fiber stress occurs only at the fixed or proximal end. That stress is progressively reduced from the fixed end to the distal end of the cantilevered beam. Hence, the cross sections along the length of a cantilevered beam having a uniform cross section are larger than necessary, except in proximity to the fixed end thereof. In a cantilevered beam of substantially uniform strength, one attempts to maintain the unit fiber stress fairly constant along the length of the cantilevered beam, and the cross section is varied according to the requirements of the fiber-stress formula for beams—viz.:

$$A_c \stackrel{\Delta}{=} \{i: N_{ic} < M_{ic},$$

wherein

M denotes: the bending moment applied to the section of the spring arm 110 under consideration, measured in inch-pounds;

s denotes: the unit fiber stress (tensile or compressive) at the outside fibers in the section under consideration, measured in pounds per square inch;

I denotes: the moment of inertia for the cross section under consideration relative to the neutral axis thereof, measured in inches$^4$; and, c denotes: the distance from the neutral axis to the outside fibers, measured in inches.

Assume, then, that one elects to employ a variation of the spring arms wherein the rectangular cross section thereof provides uniform strength along its length by employing a uniform width and a varying depth. The bending moment on any cross section of such a spring arm—at a distance "x" from the distal end 118 thereof—is the load "P" applied to, or by, the distal end 118 multiplied by the distance "x". Hence, by assigning various values for the distance, and using a predetermined value for the biasing force to be applied by the spring arm 110 having a cross section of substantially uniform strength, the appropriate depth "d" of the spring arm may be calculated by the following formula:

$$d^2 = \frac{6Px}{sB} \qquad (3)$$

wherein d denotes: the varying depth of the beam, measured in inches;

P denotes: the concentrated force to be applied by the distal end 118 of the spring arm 110, measured in pounds;

x denotes: the distance from the distal end 118 of the spring arm 110 to the cross section for which the calculation is being made, measured in inches; and, B denotes: the constant width of the beam, measured in inches.

Once the varying cross section of the beam has been calculated—or if the uniformly varying cross section has been determined by factors other than the minimum section required for providing a uniform stress along the length of the spring arm 110—the deflection required of the spring arm to apply the desired predetermined load may be mathematically calculated. For a spring arm having uniform strength provided by a rectangular cross section having a constant breadth, but having a depth that uniformly varies from the depth at the joinder of the spring arm 110 to the hub portion 108 to the depth at the distal end 118, the formula employed is:

$$y = \frac{8P}{bE}\left(\frac{l}{d}\right)^3 \qquad (4)$$

wherein y denotes: the deflection of the distal end 118 of the spring arm 110, measured in inches;

P denotes: the load applied by the distal end 118 of the spring arm 110, measured in pounds;

b denotes: the breadth of the spring arm 110, measured in inches;

E denotes: the Modulus of Elasticity of the material from which the spring arm 110 is fabricated, measured in pounds per square inch;

l denotes: the length of the spring arm 110, measured in inches; and, d denotes: the maximum depth of the spring arm 110, measured in inches.

In the situation where one elects to employ a spring arm 110 of uniform strength provided by a spring arm of rectangular cross section having a constant depth, but having a breadth that uniformly varies from the breadth at the joinder of the spring arm 110 to the hub portion 108 to the breadth at the distal end 118, the formula for determining the deflection of a spring arm 110 having that configuration is:

$$y = \frac{6P}{bE}\left(\frac{l}{d}\right)^3 \qquad (5)$$

wherein the mathematical terms are the same as those defined with respect to formula (4) above.

The deflection calculated to provide the desired biasing force to be applied by the distal end 118 of the spring arm 110 against the valve assembly 101 can be obtained by assuring the exact axial location at which the hub portion 108 of the biasing member 105 will be secured relative to the axial location of the reaction surfaces 119A and 119B. The reaction surfaces 119 may be coplanar, as shown in the drawings, but it is also possible for the reaction surfaces to be axially displaced, one with respect to the other. The axial disposition of the reaction surfaces 119, relative to the hub portion 108, must be considered when determining the preformed offset for the distal end 118 on each spring arm 110 which will bring them into engagement when the biasing member 105 is tightened into position, but without inducing any beam deflection and therefore not applying any biasing force to the valve assembly 101. The offset 129 which accomplishes that result is termed the neutral offset and is designated in FIG. 4 at 129. Only that offset in addition to the neutral offset 129 results in the deflection required for the distal end 118 of each spring arm 110 to impart the desired biasing force.

One convenient approach is to utilize a spacer means 120 that is interposed between the hub portion 108 of the primary biasing member 105 and the upper locating surface 121 of a pedestal 122 that extends upwardly from the body portion 102 of the transmission operating control valve assembly 101. For convenience, the spacer means 120 may circumscribe the shaft portion of the bolt 106. The spacer means can, therefore, constitute a relatively simple annular member. A spacer means may also be provided by positioning the locating surface 121 presented by the pedestal 122 such that it will be directly engaged by the hub portion 108 when the biasing member 105 is secured in position. By accurately positioning the axial location of the hub portion 108 relative to the axial position of the reaction surfaces, the neutral offset 129 of the distal end 118 of the spring member 105 relative to the hub portion 108 is determined. Additional axial offset constitutes the distance available through which the distal ends 118 of the spring arms 110 will deflect when the biasing member 105 is operatively positioned to secure the valve assembly 101 to the supporting surface 103.

However, it may well be desired to have the spacer means 120 also serve as a supplemental biasing means. The use of a supplemental biasing means may contribute to the uniform distribution of the forces by which the valve assembly 101 is secured against the mounting surface 103.

The spacer means 120 depicted in FIGS. 2-4 exemplifies a configuration that may also serve as a supplemental biasing member. Accordingly, the spacer means 120 includes a central hub portion 123 from which oppositely directed pairs of supplemental spring arms 124 and 125 extend. Support posts 126 extend downwardly from each pair of supplemental spring arms 124 and 125 to engage supplemental reaction surfaces 127 presented from the body portion 102 of the control valve assembly 101. Specifically, support post 126A extends downwardly from supplemental spring arm 124A, support post 126B extends downwardly from supplemental spring arm 124B, support post 126C extends downwardly from supplemental spring arm 125A and support post 126D extends downwardly from supplemental spring arm 125B.

When the spacer means 120 is fashioned to serve as a supplemental biasing member, it is preferably fabricated from a material having a Modulus of Elasticity appropriate to assist the primary biasing member 105 in securing the control valve assembly 101 to the supporting surface 103. In the exemplary embodiment of the spacer means 120 depicted, two pairs of supplemental spring arms 124 and 125, respectively, are employed. When one understands the concepts of the present invention, however, the number of supplemental spring arms employed, if any, may be determined by the size and configuration of the control valve assembly 101 to be secured to the transmission case.

Continuing, then, with a description of the spacer means 120 depicted, a mounting aperture 128 penetrates the central portion of the hub 123 to be axially registered with the aperture 109 that penetrates the hub portion 108 of the primary biasing member 105. The axial alignment of the apertures 109 and 128 permit both the primary biasing member 105 and the spacer means 120 to be secured by a single fastener, such as the bolt 106.

The dimensions of the opposed supplemental spring arms 124 and 125 utilized by the spacer means 120 may be determined by the same approach utilized to calculate the deflection required to provide a desired force or vice versa.

Thus, it should be apparent that a clamping assembly 100 embodying the concepts of the present invention is highly effective in securing a control valve assembly 101 to the supporting surface 103 on a transmission case 104. The novel clamping assembly 100 also permits the valve elements 111 received within the valve body 102 to be placed in much closer proximity. Accordingly, and as based upon the foregoing disclosure, it should now be apparent that the use of a clamping assembly 100 will accomplish the objects of the invention. As such, the scope of the invention shall include all modifications and variations that may fall within the scope of the attached claims.

The embodiments of the invention in which an exclusive property or privilege is claimed are defined as follows:

1. A clamping assembly for securing a valve body to a transmission case, said clamping assembly comprising:
   at least one biasing member having a hub portion;
   said hub portion having a generally centrally disposed aperture;
   a plurality of spring arms extending radially outwardly from said hub portion;
   said spring arms having distal ends adapted to engage the valve body;
   a spacer means interposed between said hub portion and the valve body; and
   a fastener receivable through said aperture and through the valve body to be anchored in the transmission case, thereby securing the valve body in position.

2. A clamping assembly, as set forth in claim 1, further comprising: a predetermined axial offset between the distal end of each said spring arm and said spacer means such that when said hub is tightened against said spacer means by said fastener the distal end of each said spring arm will apply a predetermined force to said valve body.

3. A clamping assembly, as set forth in claim 1, wherein:
   each said spring arm is provided with a preformed offset commensurate with the length of the spring arm, its cross-sectional configuration and the modulus of elasticity thereof such that when the hub portion of said biasing member is tightened against said spacer means, the resulting deflection of said distal end of each said spring arm will provide a predetermined load against said valve body.

4. A clamping assembly, as set forth in claim 2, wherein said spacer means further comprises:
   a spacer hub;
   supplemental spring arms extending outwardly from said spacer hub;
   post means carried on said supplemental spring arms to engage said valve body.

5. A clamping assembly, as set forth in claim 4, wherein:

each said supplemental spring arm will drive the post means carried thereon against said valve body to provide a predetermined force commensurate with the length of said supplemental spring arm, it cross-sectional configuration and the modulus of elasticity thereof when the hub portion of said biasing member is tightened against said spacer means.

6. In combination with a transmission operating control valve body having a bore therethrough and reaction surface means, a clamping assembly, said clamping assembly comprising:
   a primary biasing member having a hub portion;
   said hub portion having a generally centrally disposed aperture;
   a plurality of spring arms extending radially outwardly from said hub portion;
   each said spring arm terminating in a distal end;
   said distal ends adapted to engage the reaction surface means on said valve body;
   a spacer means extending upwardly from said valve body to be engaged by said hub portion;
   a fastener receivable through said aperture and through the valve body to be anchored in the transmission case, thereby securing the valve body in position;
   each said spring arm being provided with a preformed offset commensurate with the length of the spring arm, it cross-sectional configuration and the modulus of elasticity thereof such that when said hub portion of said biasing member is tightened against said spacer means, the resulting deflection of said distal end of each said spring arm will provide a predetermined load against said valve body.

7. A combination, as set forth in claim 6, wherein the relationship of the displacement of said distal end relative to the predetermined load to be applied thereby to said valve body operates according to the mathematical function:

$$y = \frac{Pl^3}{3EI}$$

wherein y designates the deflection of said distal end, measured in inches, P designates the load applied by said distal end, measured in pounds, l designates the length of said spring arm, measured in inches, E designates the Modulus of Elasticity of the material from which said spring arm is fabricated, measured in pounds per square inch, and, I designates the moment of inertia for the cross section of said spring arm relative to the neutral axis of that cross section, the moment of inertia being measured in inches$^4$.

8. A combination, as set forth in claim 6, wherein the relationship of the displacement of said distal end relative to the predetermined load to be applied thereby to said valve body operates according to the mathematical function:

$$y = \frac{8P}{bE}\left(\frac{l}{d}\right)^3$$

wherein y designates the deflection of said distal end, measured in inches, P designates the load applied by said distal end, measured in pounds, b designates the breadth of said spring arm, measured in inches, E designates the Modulus of Elasticity of the material from which said spring arm is fabricated, measured in pounds per square inch; l designates the length of said spring arm, measured in inches, and d designates the maximum depth of said spring arm, measured in inches.

9. A combination, as set forth in claim 6, wherein the relationship of the displacement of said distal end relative to the predetermined load to be applied thereby to said valve body operates according to the mathematical function:

$$y = \frac{6P}{bE}\left(\frac{l}{d}\right)^3$$

wherein y designates the deflection of said distal end, measured in inches, P designates the load applied by said distal end, measured in pounds, b designates the breadth of said spring arm, measured in inches, E designates the Modulus of Elasticity of the material from which said spring arm is fabricated, measured in pounds per square inch; l designates the length of said spring arm, measured in inches, and d designates the maximum depth of said spring arm, measured in inches.

* * * * *